June 20, 1939.  A. SIMON  2,163,473
MACHINERY GUARD
Filed Dec. 15, 1937
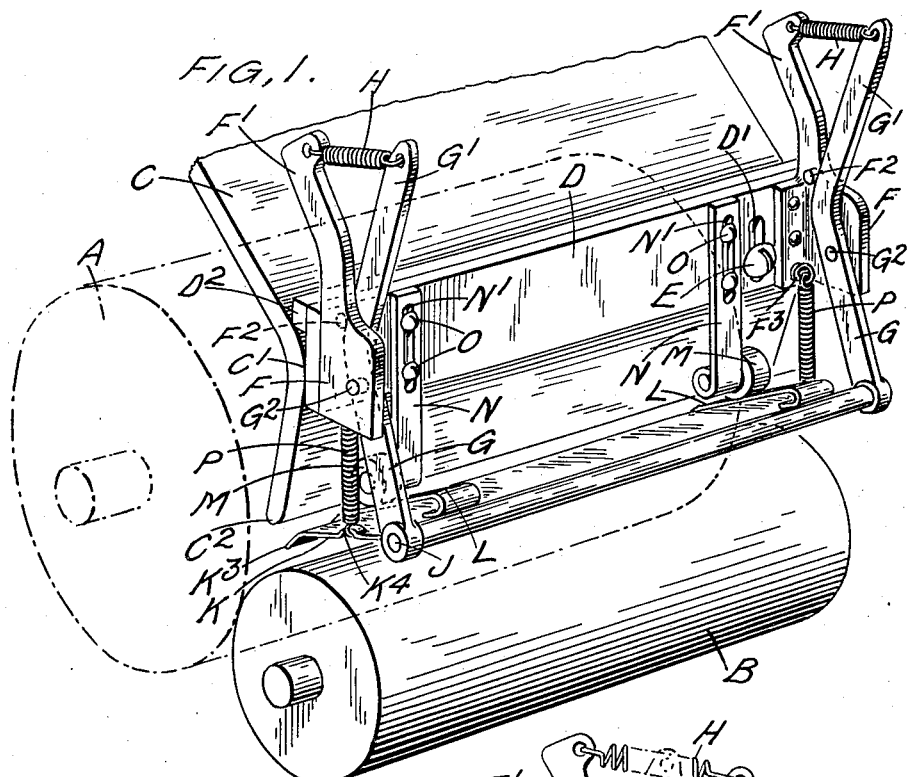
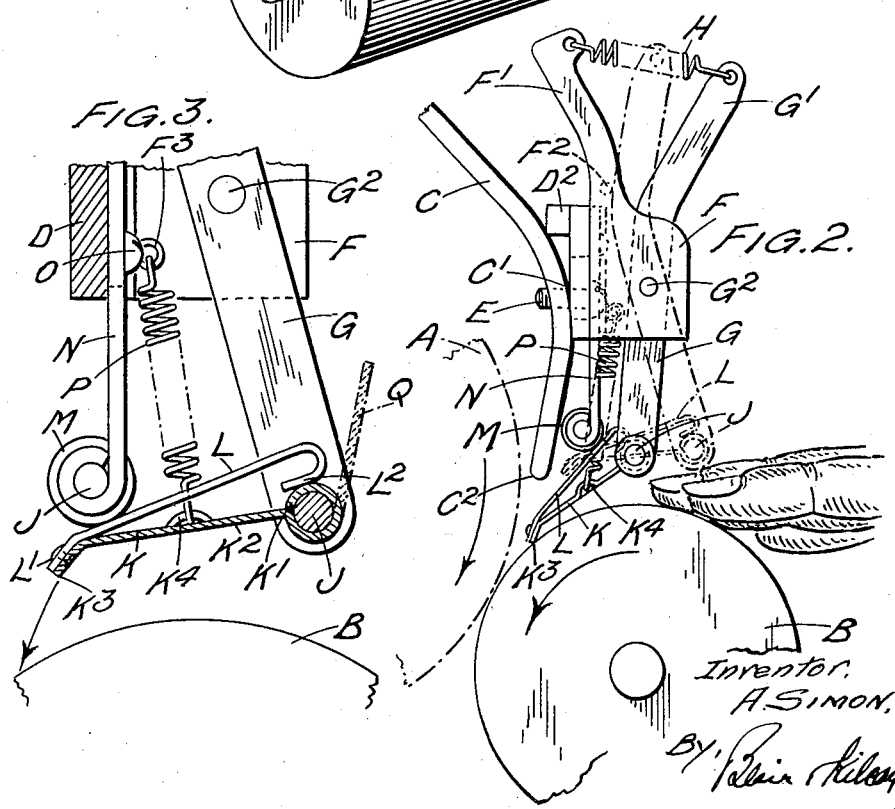
Inventor.
A. Simon,
By
Attys Patented June 20, 1939

2,163,473

UNITED STATES PATENT OFFICE 2,163,473

MACHINERY GUARD

Abram Simon, Northampton, England

Application December 15, 1937, Serial No. 180,011
In Great Britain December 31, 1936

5 Claims. (Cl. 74—612)

This invention relates to machinery guards and has for its object to provide means which, while of simple and compact construction, will tend to prevent the hands or clothing of an attendant or operator from passing into contact with the moving parts of a machine to which the material upon which the machine is to operate is fed manually by the operator.

In cutting or planing machines of the rotary drum type it is usual to provide a guard plate or grid over the rotor so as to leave only a gate or opening through which the work can be fed to the rotor. While such guard plate or grid prevents contact with the rotor from above, it does not preclude the possibility of the hands or clothing of an operator passing into or being drawn through the gate into contact with the rotor.

A machinery guard according to the present invention comprises a yieldingly mounted guard member part of which constitutes one limit or boundary of a feed opening through which material is fed by hand to the machine, the guard member being constructed and arranged so that, should a hand of the operator tend to pass or be drawn into the opening it will come into contact with the guard member to cause it to move towards the moving parts of the machine and also downwards, thereby tending to close the feed opening. Conveniently the machinery guard considered as a whole has two main parts, one of which comprises the guard member, a portion of which constitutes one limit or boundary of the feed opening and the other part of which comprises a gate member connected to the guard member in such manner that when a hand of the operator tends to pass or be drawn into the feed opening it will come into contact with and move the guard member in a downward direction and it in turn will move the gate member downwards to close this opening.

Conveniently the other limit or boundary of the feed opening is constituted by the cylindrical surface of a feed roller or drum over which material is fed to the machine.

The guard member may be mounted to slide or pivot but in a preferred arrangement the guard member is pivotally mounted, and is loaded by a device, as for example by a spring, so that when the guard member is actuated it will move about its pivot against the action of such loading device.

In one arrangement the gate member may be pivotally connected to the guard member and may have a part formed and functioning as a cam, the gate member being loaded by a device, as for example by a spring, so that the part formed as a cam bears against and is moved by one or more fixed abutments or rollers. Thus, as the guard member moves against the action of its loading device the cam-like part of the gate member slides or rolls over the abutments or rollers and the gate member is thus turned about its pivot against the action of its associated loading device so as to close the feed opening. Preferably the position of each abutment or roller is adjustable relatively to the part of the gate member formed as a cam. Such adjustment is useful to enable the gate member to be set in a correct initial position relatively to the feed roller as wear takes place on the parts of the machine. When such a machinery guard is used on machines such for example as shaving or cutting machines which operate on flexible materials, the free end of the gate member is conveniently curved so that when it is actuated to close the feed opening the curved end thereof will make contact with and grip the flexible material on the feed roller and thereby prevent further feed of such material into the machine.

The machinery guard may be mounted on a rigid support which is adjustable in a vertical direction and preferably also in the horizontal direction. Thus the position of the machinery guard as a whole can be adjusted relatively to the feed roller so that the guard and the feed roller can be maintained in their correct relative positions and relatively to the moving parts of the machine, and also the position of the gate member can be altered independently of such adjustment of the whole so as to adjust the movement thereof relatively to the feed roller when the gate member is actuated by the cam-engaging abutments or rollers.

The invention may be carried into practice in various ways, but one construction embodying the invention as applied to a rotary machine of known type for surfacing skins will now be described by way of example with reference to the accompanying drawing, in which Figure 1 is a perspective view showing one construction of machinery guard according to the invention, Figure 2 is a side elevation showing two positions of the guard mechanism, and Figure 3 is a side elevation on an enlarged scale showing further details of construction.

The machine comprises a rotor shown somewhat diagrammatically at A having a series of radial or helical blades or cutters (not shown) on its periphery. Arranged to cooperate with the rotor A is a feed roller B which is rotatable about an axis parallel to that of the rotor, means being conveniently provided for moving the feed roller B towards and away from the rotor A. Preferably the arrangement is such that the drive transmitted to the feed roller B when moved towards the rotor A is automatically stopped when the feed roller is moved away from the rotor. Normally a very slow speed drive is transmitted to the feed roller, whereby the material is fed slowly to a high speed rotor. In the case of flexible materials such as leather, it is usual for the operator to place the material on the feed roller and, having moved the roller towards the rotor so that the drive is automatically transmitted thereto, to hold the material in contact with the upper surface of the roller B and positively direct the material by hand into the machine. Fixed in position over the rotor is a guard plate C somewhat curved as shown at $C^1$, the lower edge $C^2$ of which extends parallel to and a short distance from the feed roller B. Thus when the feed roller B is moved into its operative position, that is to say adjacent the rotor A, a feed opening is available between the lower edge $C^2$ of the guard plate C and the upper surface of the feed roller B. While therefore accidental contact with the rotor from above is prevented by the fixed guard plate C as arranged in the known machine, the latter does not preclude the possibility of a hand or part of the clothing of an operator passing through the feed opening into contact with the blades of the rotor.

The machinery guard provided according to this invention is secured to the existing guard plate C which is formed as in known machines except for the particular curved portion $C^1$ thereof, and comprises a base plate D secured to the guard plate C by bolts E passing through adjusting slots $D^1$ formed in the plate D. The plate D is provided with a projection $D^2$ of square section which extends along the back of the upper edge of the plate. The projection $D^2$ cooperates with the curved surface $C^1$ of the guard plate C, so as to rock the base plate D in a horizontal direction in accordance with the curvature of the guard plate C, when the slot adjustment $D^1$ is used to alter the position of the base plate D in the vertical direction. On the ends of the base plate D are two lugs F each of which carries pivoted thereto a two-armed lever G, $G^1$. The two two-armed levers G, $G^1$ are loaded by tension springs H each extending between the upper lever arm $G^1$ and an upwardly directed projection $F^1$ from the lug F. The springs H tend to maintain the upper lever arms $G^1$ against stops $F^2$ on the lugs F. A rod J constituting the guard member of the machinery guard is rotatably carried by the lower lever arms G and extends above the surface and parallel to the axis of the feed roller B. Thus, when the two two-armed levers G, $G^1$ are rocked about their pivots $G^2$ against the action of the loading springs H, the rod J swings both towards the rotor A and downwardly towards the feed roller B to tend to close the feed opening.

A gate member comprising a plate K extends the length of the feed roller and is secured to the rod J as by bending one longitudinal edge $K^1$ thereof round the rod J so that the plate K is directed towards the rotor. Conveniently the under face $K^2$ of the plate K lies in or near a plane passing through the axis of the rod J so that this face $K^2$ is set back and upwardly behind the rod J. The other longitudinal edge $K^3$ of the plate K is curved slightly downwards and has secured thereto at intervals along its length two cam-like strips L. Each of these strips is rigidly secured to the plate K only at its lower end $L^1$ as by rivets, its upper end having a part formed as a crook the end $L^2$ of which lies on a part of the plate K which surrounds the rod J. Cooperating with each cam-like part L is a roller M carried at the lower end of a bar N secured to the base plate D by bolts O passing through adjusting slots $N^1$ formed in the bar N. The plate K is loaded by tension springs P connected between eyelets $K^4$ formed by pressing out the plate K in known manner, and eyelets $F^3$ carried by the rivets securing the lugs F to the base plate D. These springs ensure that the cam-like strips L are maintained in contact with the rollers M.

In practice the operator places a skin on the feed roller B and moves it towards the rotor A into its operative position, holding the skin in contact with the upper surface of the feed roller B while it is being fed through the feed opening into contact with the rotor A. Should the operator's hand pass into the feed opening owing to the skin becoming creased or the thickened portion thereof being suddenly engaged by the rotor A, the finger ends of the operator's hand will first come into contact with the part of the plate K surrounding the rod J in the position shown in dotted lines in Figure 2 and move the rod J both towards the rotor A and downwardly towards the feed roller B into the position shown in full lines in Figure 2, thereby rocking the two two-armed levers G, $G^1$ against the action of the springs H. Such movement causes the cam-like strips L to be acted on by the rollers M so as to move the plate K downwardly against the action of the springs P into contact with the skin on the roller B. The curved portion $K^3$ of the plate K will grip the skin and prevent further feed thereof into the machine. It will be seen that the space formed under the plate K behind the rod J accommodates the finger nails of the operator and prevents their being crushed when the rod J and the plate K move downwardly towards the feed roller B.

In some cases in which the extent of the feed opening is relatively great since the lower edge $C^2$ of the plate C does not extend so low over the rotor A, it may be desirable to mount on or over the rod J an additional guard in the form of a vertical front plate Q, as shown in dotted lines in Figure 3, so that there shall be no possibility of the hands of the operator passing into the feed opening over the top of the rod J.

As wear takes place on the blades of the rotor and the feed roller is moved closer to the axis of the rotor, the position of the machinery guard may be adjusted relatively to successive positions of the feed roller. Thus, the position of the guard as a whole may be adjusted by slackening the bolts E and moving the slotted base plate D up or down for adjustment in a vertical direction, thereby also rocking the plate D in the horizontal direction. In addition the position of the plate K may be independently adjusted relatively to the feed roller B by slackening the bolts O and moving the supporting bars N so that the position of the cam rollers M are adjusted in the vertical direction.

What I claim as my invention and desire to secure by Letters Patent is:

1. A guard for a machine having a feed surface over which material is fed by hand to a movable member adapted to act on the face of the material, comprising two parts extending transversely across feed surface and normally spaced therefrom, the space between the said feed surface and one part of the guard constituting a feed opening, a support forming a portion of the machine to which the same part of the said guard, constituting a guard member, is pivoted to allow movement in the direction in which the material is fed, the second part of said guard constituting a gate pivotally connected to the guard member and movable therewith when the guard member is moved in the direction in which the material is fed and also downwardly towards the said surface over which the material is fed, and means operating on the gate to impart said downward movement when the guard member is moved.

2. A guard for a machine of the character set forth in claim 1, including spring actuated means operative on the guard member, and spring actuated means operative on the gate serving in each case to return the two parts of the guard after manual operation thereof to their normal positions.

3. A guard for a machine of the character set forth in claim 1, including a cam secured to a fixed part of the machine and operative on the gate to impart said downward movement when the guard member is moved.

4. A guard for a machine of the character set forth in claim 1, including a cam secured to a fixed part of the machine and operative on the gate to impart said downward movement when the guard member is moved, and means for adjusting the position of the cam in relation to the gate.

5. A guard for a machine of the character set forth in claim 1, including a fixed supporting member extending transversely across the feed surface, a plate member, means for adjustably connecting the plate member to the supporting member adapted to permit the plate member not only to be moved upward and downward in relation to the feed surface but also to be rocked about a horizontal axis, means for pivotally mounting the guard member on said plate member, a cam operative on the gate to impart said downward movement when the guard member is moved, and means for adjusting the position of the cam in relation to the gate thereby to vary such downward movement.

ABRAM SIMON.